(12) United States Patent
Chamberlin et al.

(10) Patent No.: US 7,789,337 B1
(45) Date of Patent: Sep. 7, 2010

(54) METHOD OF WINDING AN ELECTRIC MOTOR CORE MEMBER

(75) Inventors: Brad Chamberlin, Pendleton, IN (US); Sean Stanley, Huntington, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 0 days.

(21) Appl. No.: 12/415,255

(22) Filed: Mar. 31, 2009

(51) Int. Cl.
*B65H 39/16* (2006.01)
(52) U.S. Cl. .................................... 242/444.3
(58) Field of Classification Search ............... 242/437.1, 242/432, 432.6, 433.4, 444.3
See application file for complete search history.

(56) References Cited

U.S. PATENT DOCUMENTS

| | | | | |
|---|---|---|---|---|
| 5,664,317 A * | 9/1997 | Ponzio et al. | .................. | 29/596 |
| 5,668,421 A * | 9/1997 | Gladish | .................... | 310/12.11 |
| 6,325,318 B1 * | 12/2001 | Stratico et al. | ........... | 242/433.4 |
| 6,685,127 B2 * | 2/2004 | Takano et al. | ............. | 242/432.2 |
| 6,941,644 B2 * | 9/2005 | Shteynberg et al. | ........... | 29/605 |
| 7,017,850 B2 * | 3/2006 | Stratico et al. | ........... | 242/432.3 |
| 7,135,799 B2 * | 11/2006 | Rittmeyer | .................... | 310/180 |
| 7,152,301 B2 * | 12/2006 | Rittmeyer | .................... | 29/596 |
| 2004/0150287 A1 * | 8/2004 | Wainio et al. | ................ | 310/218 |
| 2005/0242678 A1 * | 11/2005 | Rittmeyer | .................... | 310/179 |

* cited by examiner

*Primary Examiner*—Emmanuel M Marcelo
(74) *Attorney, Agent, or Firm*—Cantor Colburn LLP

(57) ABSTRACT

A method of winding an electric motor core member includes continuously winding a single conductor about a portion of an electric motor core member, and separating the single, continuously wound conductor into multiple phase windings.

13 Claims, 5 Drawing Sheets

METHOD OF WINDING AN ELECTRIC MOTOR CORE MEMBER

BACKGROUND

The subject matter disclosed herein relates to the art of electric machines and, more particularly, to a method of winding a core member for an electric motor.

A multi-phase motor core includes a winding having multiple wire conductors that interact with a back iron core having a plurality of tooth members that form a portion of a stator. Each conductor is wound around an appropriate tooth and then connected to a main conductor for each phase. In the case of a three-phase motor, this may lead to many connections. As such, the multi-phase winding is not a process that is readily automated. More specifically, when constructing multi-phase electric motors, each core winding must be fabricated by hand to ensure proper isolation between each phase and between each phase and a neutral conductor.

SUMMARY

According to one aspect of the invention, a method of winding an electric motor core member includes continuously winding a single conductor about a portion of an electric motor core member, and separating the single, continuously wound conductor into multiple phase windings.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
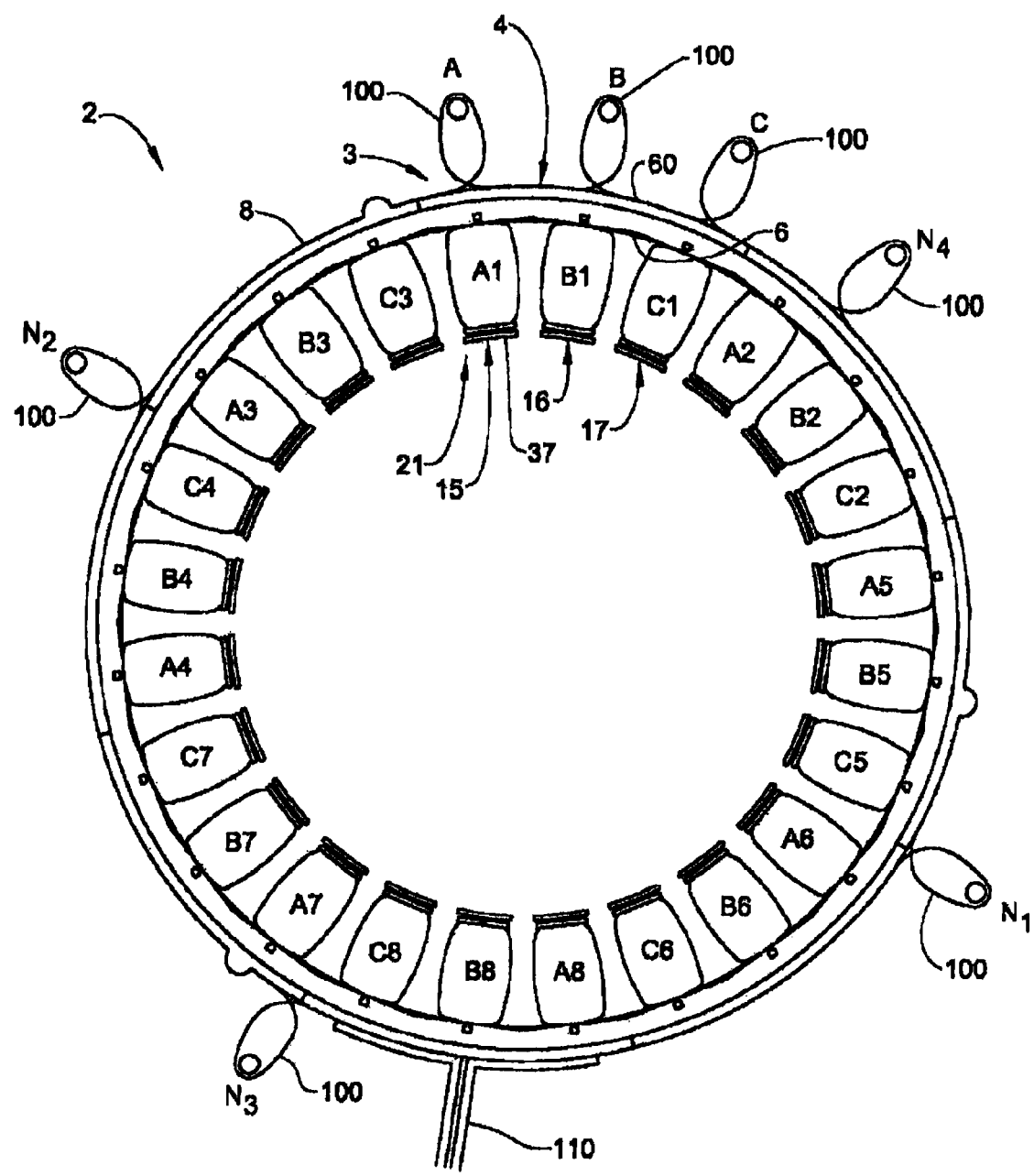
FIG. 1 is an elevational view of a electric motor core member in accordance with an exemplary embodiment.
Figure 2:
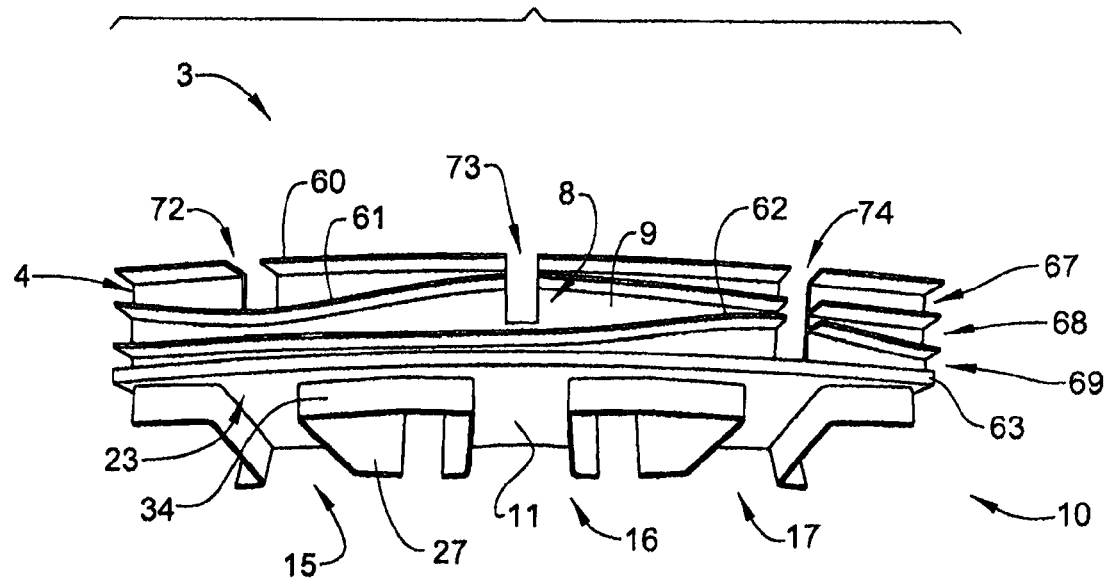
FIG. 2 is an exploded view of a segment of the electric motor core member of FIG. 1.
Figure 2:
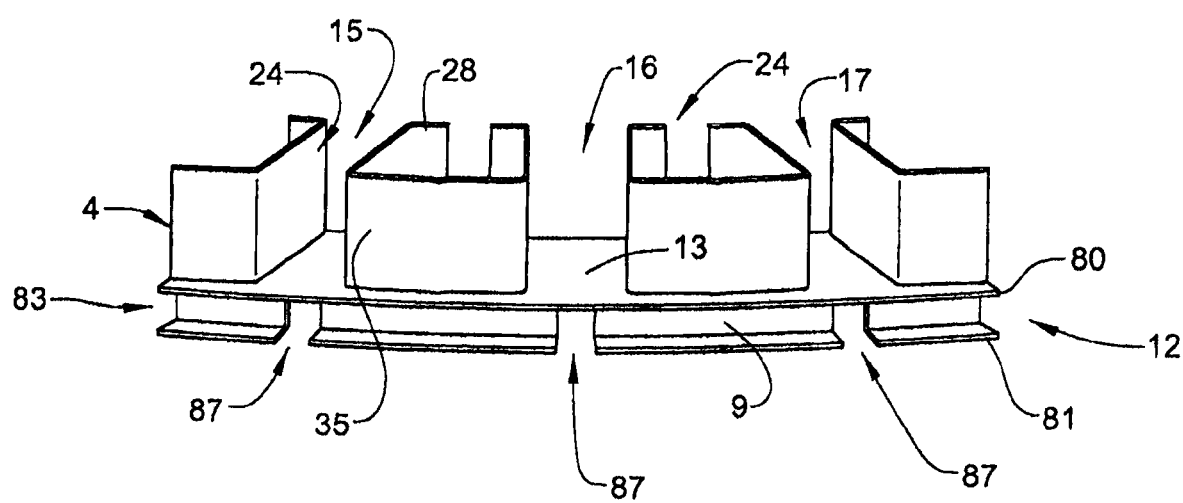
Figure 3:
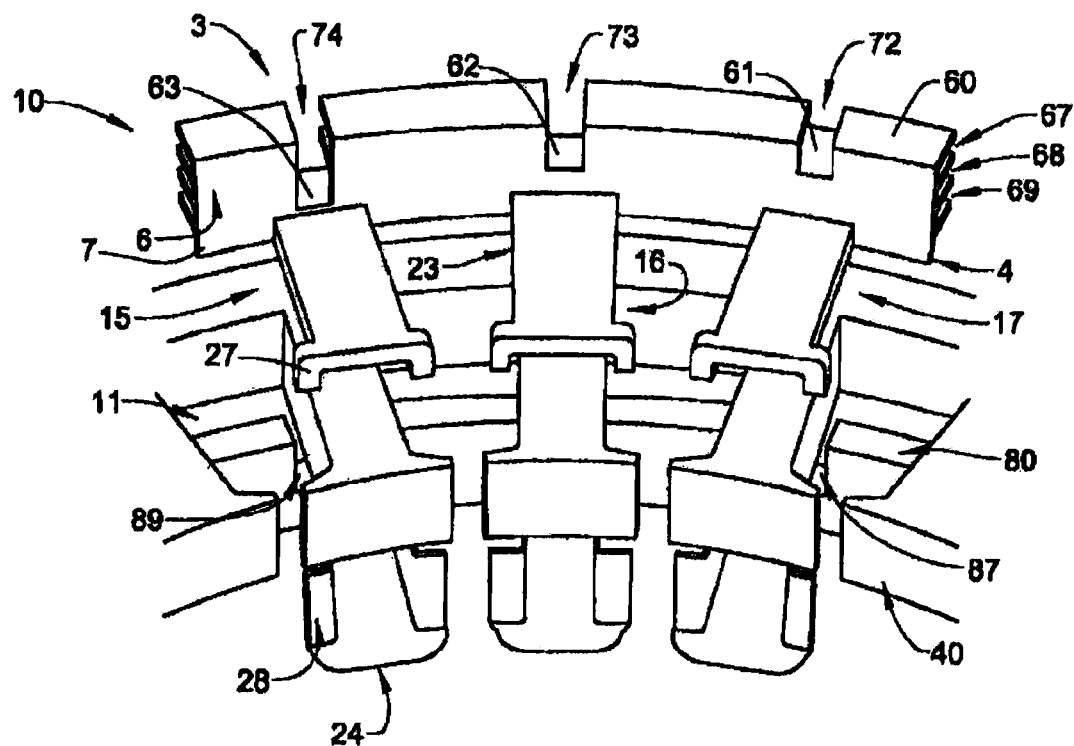
FIG. 3 is an upper front elevational perspective view of the segment of the electric motor core member of FIG. 2.
Figure 4:
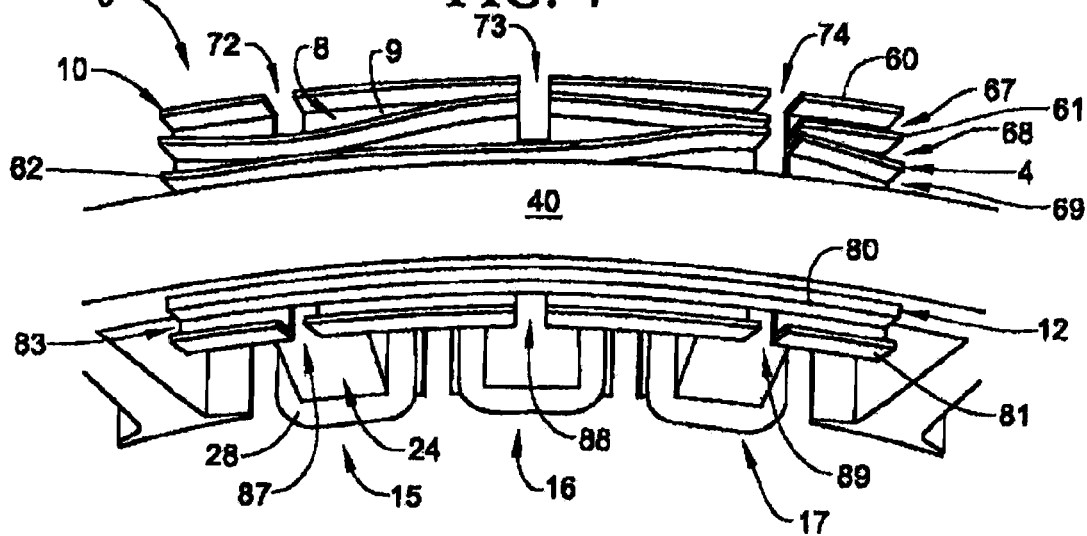
FIG. 4 is a lower rear perspective view of a segment of the electric motor core member if FIG. 1.

With reference to FIGS. 1-4, an electric motor core member constructed in accordance with an exemplary embodiment is generally indicated at 2. Electric core member 2 is formed from a plurality of segments, one of which is indicated at 3. In the exemplary embodiment shown, electric core member 2 includes eight (8) segments 3. Each segment 3 includes a main body 4 having an inner diametric portion 6 including an inner arcuate surface 7 and an outer diametric portion 8 including an outer arcuate surface 9. As will be detailed more fully below, main body 4 is formed by joining a first or phase conductor portion 10 having at least a first surface portion 11 with a second or neutral conductor portion 12 having at least a first surface section 13. Once phase conductor portion 10 and neutral conductor portion 12 are joined, segment 3 includes a plurality of coil isolator members 15-17. As each coil isolator member 15-17 is substantially identical, a detailed description will follow with respect to coil isolator member 15 with an understanding that the remaining coil isolator members 16 and 17 are similarly constructed.

Coil isolator member 15 includes a coil isolator portion 23 that projects laterally outwardly from inner arcuate surface 6 on phase conductor portion 10 and a coil isolator section 24 that projects laterally outwardly from inner arcuate surface 6 on neutral conductor portion 12. Coil isolator portion 23 includes a coil stop portion 27 while coil isolator section 24 includes a coil stop section 28. In addition, phase conductor portion 10 includes a plurality of snap elements, one of which is indicated at 34 that project axially outwardly from first surface section 11. Neutral conductor portion 12 includes a plurality of snap members, one of which is indicated at 35 that project axially outwardly from first surface section 13. With this configuration, phase conductor portion 10 is snap-fittingly joined to neutral conductor portion 12 to form segment 3, with coil isolator member 15 being formed from coil isolator portion 23 and coil isolator section 24. Once formed, coil isolator member 15 includes a coil stop 37 formed by coil stop portion 27 and coil stop section 28. With this arrangement, multiple segments 3 are snap-fittingly joined one to another about a back iron 40 in order to form core member 2.

In accordance with an exemplary embodiment, segment 3 includes a first wall member 60, a second wall member 61, a third wall member 62, and a fourth wall member 63. Each wall member 60-63 extends laterally outward from outer arcuate surface 9. In addition, each wall member 60-63 is spaced one from another in order to form a plurality of conductor isolation channels. More specifically, first and second wall members 60 and 61 form a first conductor isolation channel 67, second and third wall members 61 and 62 form a second conductor isolation channel 68, and third and fourth wall members 62 and 63 form a third conductor isolation channel 69. As will be discussed more fully below, conductor isolation channels 67-69 provide passage for an electrical conductor with wall members 60-63 providing electrical isolation between phase portions of the conductor.

In further accordance with the exemplary embodiments, phase conductor portion 10 includes a plurality of conductor inlet members that provide passage from respective ones of conductor isolation channels 67-69 corresponding ones of coil isolation members 15-17. More specifically, phase conductor portion 10 includes a first conductor inlet member 72 that leads from first conductor isolation channel 67 to coil isolation member 15, a second conductor inlet member 73 that leads from second conductor isolation channel 68 to coil isolator member 16 and a third conductor inlet member 74 that leads from third conductor isolation channel 69 to coil isolator member 17. In order to provide adequate spacing, and access to each coil isolator member 15-17, wall members 60-63 extend across outer arcuate surface 9 in a sinusoidal pattern. In addition to wall members 60-63 on phase conductor portion 10, neutral conductor portion 12 includes a fifth wall member 80 and sixth wall member 81 that project laterally outward from outer arcuate surface 9 to form a fourth conductor isolation channel 83. In a manner also similar to that described above, neutral conductor portion 12 includes a plurality of neutral conductor inlet members 87 that provide passage for a neutral portion of conductor 100 to each of the plurality of coil isolation members 15-17.

Figure 5:
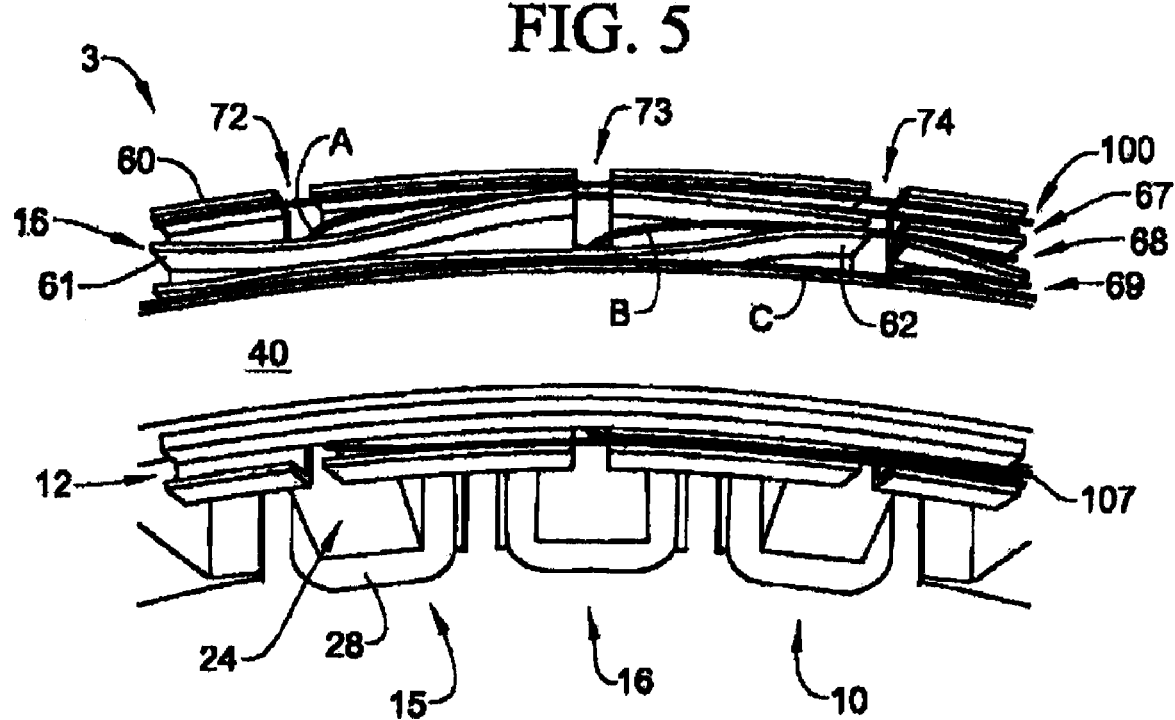
FIG. 5 is a lower rear perspective view of a segment of the electric motor core member of FIG. 4 including a continuous multi-phase winding.
Figure 6:
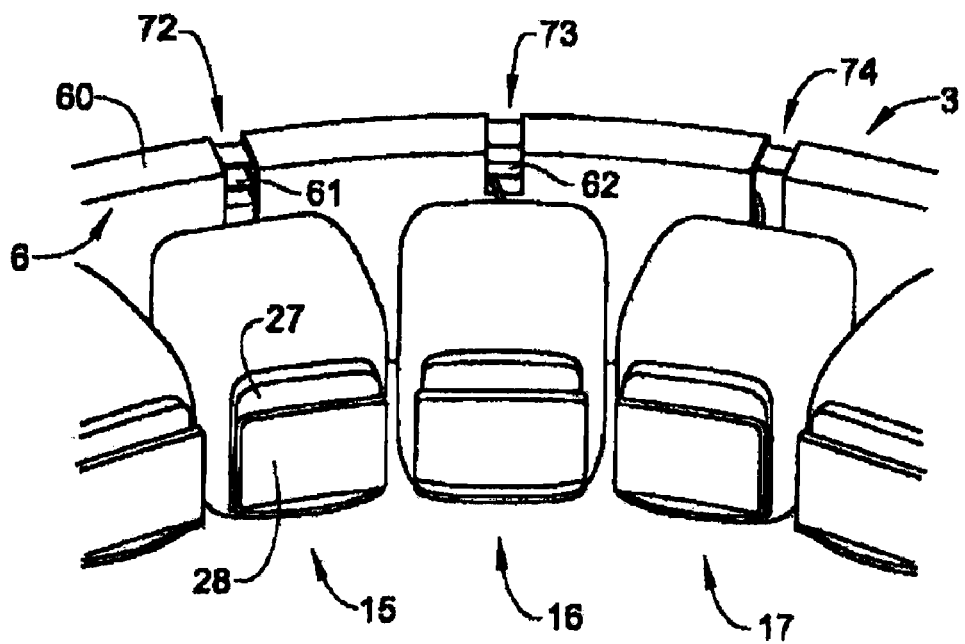
FIG. 6 is an upper front elevational perspective view of the segment of the multi-phase electric motor core member of FIG. 5.
Figure 7:
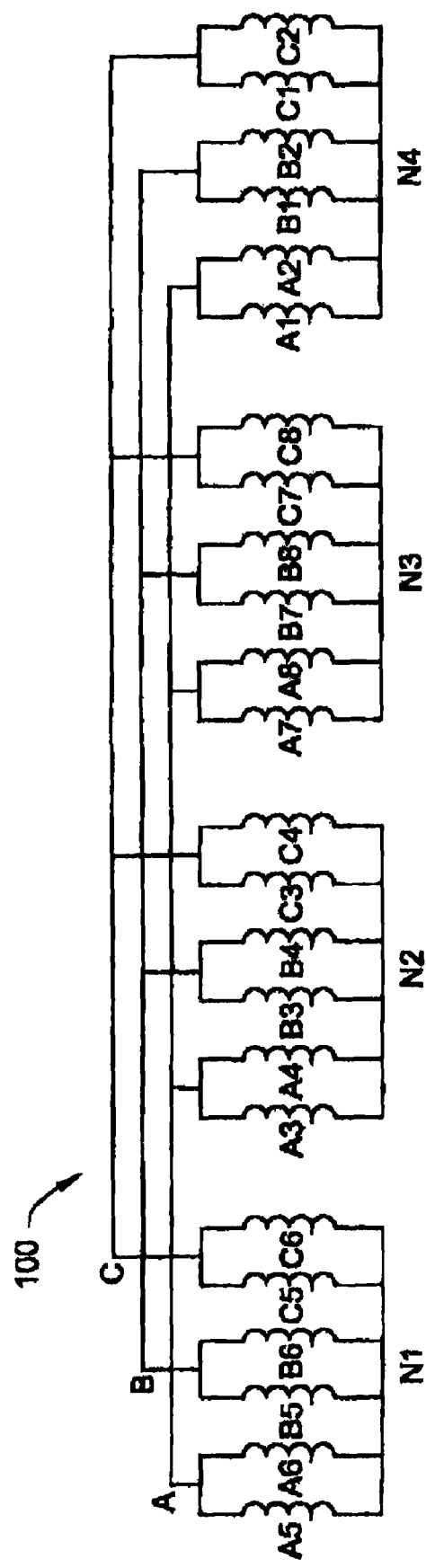
FIG. 7 is a schematic diagram illustrating the continuous multi-phase winding connections in accordance with an exemplary embodiment.

Reference will now be made to FIGS. 1 and 5-7 in describing a method of winding electric core member 2 with a single continuous conductor 100. In accordance with the exemplary embodiment, the single conductor 100 is continuously wound about electric core member 2. Single continuous conductor 100 is initially wrapped about post A guided toward conductor isolation channel 69 passed through first conductor inlet member 74 and wrapped, in a first direction about a first one of the plurality of coil isolation members to form a first pole A1. Conductor 100 then passes from the first pole A1 through neutral conductor inlet member 87, along isolation channel 83, around post N4, through another neutral conductor inlet member 87 and wrapped, in a second direction, about a second one of the plurality of coil isolation members to form a second pole A2.

At this point, conductor 100 is passed through the conductor inlet member 74 associated with pole A2, guided along isolation channel 69, wrapped about post A and guided back into conductor isolation channel 69. Conductor 100 is then passed through another conductor inlet member 74, wrapped, in the first direction, about yet another of the plurality of coil isolation members to form a third pole A3. Conductor 100 is then passed through the associated neutral conductor inlet member 87, along isolation channel 83, and wrapped around post N2. Conductor 100 is then passed back into isolation channel 83, passed through a neutral conductor inlet member 87 and wrapped, in the second direction, about another coil isolation member to form a fourth pole A4.

From pole A4, conductor 100 is passed through the associated conductor inlet member 74, and back into isolation channel 69. Conductor 100 is wrapped about post A and returned to isolation channel 69 before being guided to another conductor inlet member 74 and wrapped, in the first direction, about another coil isolation member to form a fifth pole A5. Conductor 100 is then passed through the associated neutral conductor inlet member 87, along isolation channel 83, and wrapped around post N1. Conductor 100 is then passed back into isolation channel 83, passed through a neutral conductor inlet member 87 and wrapped, in the second direction, about another coil isolation member to form a sixth pole A6.

Finally, conductor 100 is passed through the associated conductor inlet member 74, and back into isolation channel 69. Conductor 100 is wrapped about post A and returned to isolation channel 69 before being guided to another conductor inlet member 74 and wrapped, in the first direction, about another coil isolation member to form a seventh pole A7. Conductor 100 is then passed through the associated neutral conductor inlet member 87, along isolation channel 83, and wrapped around post N3. Conductor 100 is then passed back into isolation channel 83, passed through a neutral conductor inlet member 87 and wrapped, in the second direction, about another coil isolation member to form an eighth pole A8 before being returned to post A completing the formation of the first set of poles associate with phase A.

After forming the first set of poles, conductor 100 is passed from post A, into isolation channel 68 and wrapped around post B. From post B, conductor 100 is guided through isolation channel 68, passed through conductor inlet member 73 and wrapped, in the first direction around another coil isolation member to form a first pole B1. Conductor 100 passes from the first pole B1 through neutral conductor inlet member 87, along isolation channel 83, around post N4, through another neutral conductor inlet member 87 and wrapped, in a second direction, about a second one of the plurality of coil isolation members to form a second pole B2. This process continues until poles B3-B8 are formed in a manner similar to that described above. After forming the second set of poles, B, conductor 100 is utilized to form a third set of poles C in a manner similar to that described above. When forming poles C1-C8, conductor 100 is passed through isolation channel 67 and inlet members 72. Once fully wound, conductor 100 is separated or cut and joined at appropriate points, e.g., posts N1-N4 to establish multiple phase windings, i.e., phase windings A-C. With this arrangement, the electric motor core member is wound with a single continuous conduction thereby enabling automation of assembly.

In general, this written description uses examples to disclose exemplary embodiments, including the best mode, and also to enable any person skilled in the art to practice the exemplary embodiment, including making and using any devices or systems and performing any incorporated methods. The patentable scope of the exemplary embodiment is defined by the claims, and may include other examples that occur to those skilled in the art. Such other examples are intended to be within the scope of exemplary embodiments if they have structural elements that do not differ from the literal language of the claims, or if they include equivalent structural elements with insubstantial differences from the literal language of the claims.

The invention claimed is:

1. A method of winding an electric motor core member, the method comprising:
   continuously winding a single conductor about a portion of an electric motor core member; and
   separating the single, continuously wound conductor into multiple phase windings.

2. The method of claim 1, further comprising: electrically isolating a portion of each of the multiple phase windings with at least one wall member.

3. The method of claim 2, wherein electrically isolating a portion of each of the multiple phase windings includes arranging each of the multiple phase windings in a corresponding conductor isolation channel while continuously winding the single conductor.

4. The method of claim 1, further comprising: passing a portion of the single conductor around a neutral conductor portion of the core member.

5. The method of claim 1, further comprising:
   passing the single conductor through a conductor inlet member formed in the electric motor core member; and
   winding the single conductor in a first direction around a coil isolation member to form a first pole.

6. The method of claim 5, further comprising:
   passing the single conductor from the pole into a neutral conductor isolation channel; and
   guiding the single conductor from the neutral conductor isolation channel through another conductor inlet member to another coil isolation member; and
   wrapping the single conductor around the another coil isolation member in a second direction to form a second pole.

7. The method of claim 6, further comprising: passing the single conductor around a post before passing from the neutral conductor isolation channel and through the another conductor inlet member to another coil isolation member.

8. The method of claim 6, further comprising:
   guiding the single conductor from the second pole through a conductor inlet member and into an isolation channel;

passing the single conductor along the isolation channel and through another conductor inlet member towards yet another coil isolation member; and wrapping the single conductor around the yet another coil isolation member in the first direction to form a third pole.

9. The method of claim 8, further comprising: passing the single conductor around a post before passing through the another conductor inlet member towards the yet another coil isolation member.

10. The method of claim 8, further comprising:

forming a plurality of poles with the single, continuously wound conductor; and arranging the plurality of poles to form one phase of the electric motor core member.

11. The method of claim 1, wherein continuously winding a single conductor about an electric motor core member comprises:

winding the conductor around a first phase pole of the core member;

passing the conductor along a conductor isolation channel formed on the core member from the first phase pole to a second pole; and winding the conductor around the second phase pole of the core member.

12. The method of claim 11, wherein passing the conductor to the second pole comprises passing the conductor from the first pole, through a conductor inlet member, into the conductor isolation channel and towards the second pole.

13. The method of claim 12, wherein passing the conductor to the second pole comprises passing the conductor from the conductor isolation channel through a conductor inlet member to the second pole.

* * * * *